United States Patent
Sakurai

(12) 
(10) Patent No.: US 6,345,786 B1
(45) Date of Patent: Feb. 12, 2002

(54) LINKED MULTI-SEGMENT LANDING GEAR DOOR FOR AIRCRAFT

(75) Inventor: Seiya Sakurai, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/518,108

(22) Filed: Mar. 3, 2000

(51) Int. Cl.⁷ .......................... B64C 25/10; B64C 25/00
(52) U.S. Cl. ............................. 244/102 R; 244/100 R
(58) Field of Search .................... 244/129.5, 102 R, 244/102 A, 104 R, 100 R

(56) References Cited

U.S. PATENT DOCUMENTS

| | | | |
|---|---|---|---|
| 2,378,856 A | 6/1945 | Laddon et al. | 160/209 |
| 2,445,131 A | 7/1948 | Wartian | 244/129.5 |
| 2,457,625 A | 12/1948 | Amiot | 244/129.5 |
| 2,570,534 A * | 10/1951 | Erny | 244/100 R |
| 2,577,385 A * | 12/1951 | Troendle | 244/102 R |
| 2,604,281 A | 7/1952 | Buchal et al. | 244/129.5 |
| 2,645,436 A * | 7/1953 | Brown | 244/102 R |
| 2,658,792 A | 11/1953 | Scott | 49/163 |
| 2,670,156 A | 2/1954 | Clark et al. | 244/63 |
| 2,692,097 A * | 10/1954 | Payne | 244/102 R |
| 2,731,221 A | 1/1956 | Holton | 244/129.5 |
| 2,747,817 A * | 5/1956 | Saulnier | 244/102 R |
| 2,869,806 A * | 1/1959 | Beach | 244/102 R |
| 2,921,501 A | 1/1960 | Parot | 89/1.51 |
| 2,941,756 A * | 6/1960 | Roberts | 244/102 R |
| 3,174,712 A | 3/1965 | Ricard | 244/129.5 |
| 3,393,883 A * | 7/1968 | Smith et al. | 244/102 R |
| 3,486,721 A | 12/1969 | Myczinski | 244/53 R |
| 3,506,223 A | 4/1970 | Flemming | 244/129.5 |
| 3,585,757 A | 6/1971 | Ritchie et al. | 49/215 |
| 3,718,171 A | 2/1973 | Godwin | 160/210 |
| 4,408,736 A * | 10/1983 | Kirschbaum et al. | 244/100 R |
| 4,412,665 A * | 11/1983 | Kramer et al. | 244/102 R |
| 4,845,804 A * | 7/1989 | Garrett | 244/102 R |
| 5,181,677 A | 1/1993 | Kaplan et al. | 244/129.5 |
| 5,482,228 A * | 1/1996 | Hoshino | 244/102 R |

* cited by examiner

Primary Examiner—Charles T. Jordan
Assistant Examiner—Christian M. Best
(74) Attorney, Agent, or Firm—Robert B. Hughes; Hughes Law Firm, PLLC

(57) ABSTRACT

A door assembly for a landing gear of an aircraft. The door assembly comprises a door section that in turn has two panels, moveable between closed and open positions by a positioning section. In one embodiment, the positioning section comprises mounting arms fixed to the panels which are connected by parallel linkages and which move the panels in a rotational path from a closed position aligned with the door opening through a path of rotation to a location spaced laterally of the door opening, with the panels being in proximity with another and these partially overlapping. In another arrangement, the inside surfaces of the panels face one another in the open position, and the panels are hinge mounted to one another.

43 Claims, 8 Drawing Sheets

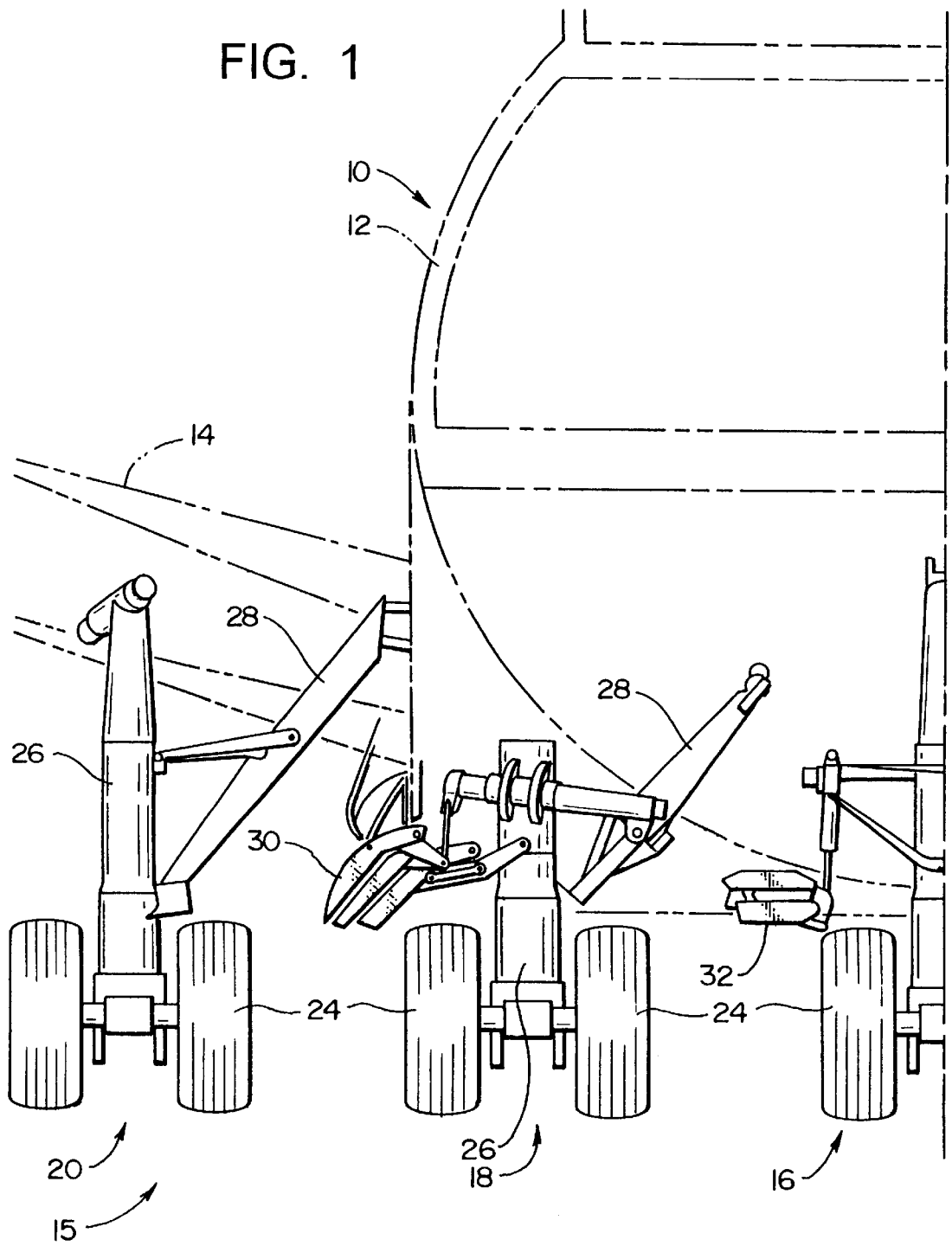

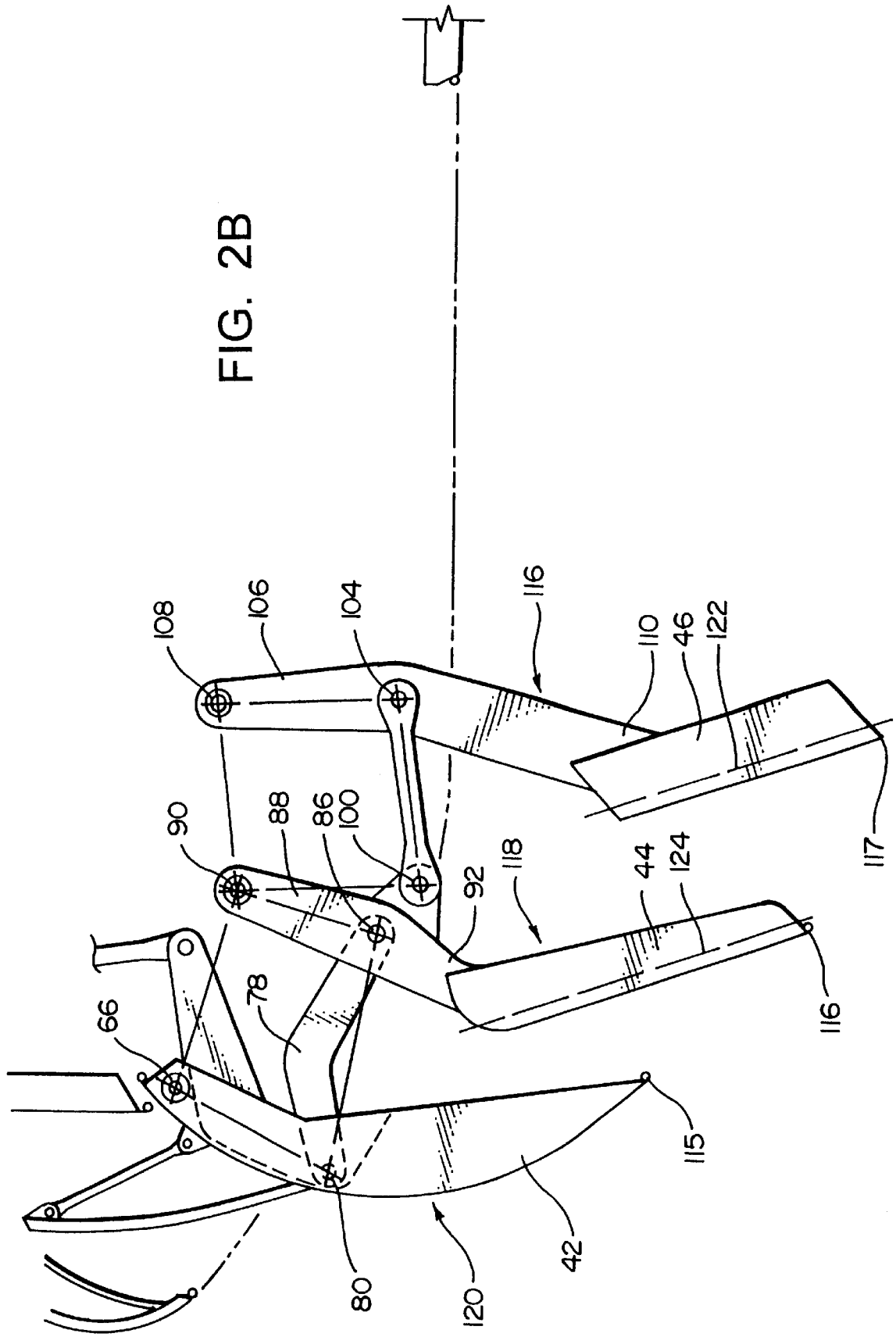

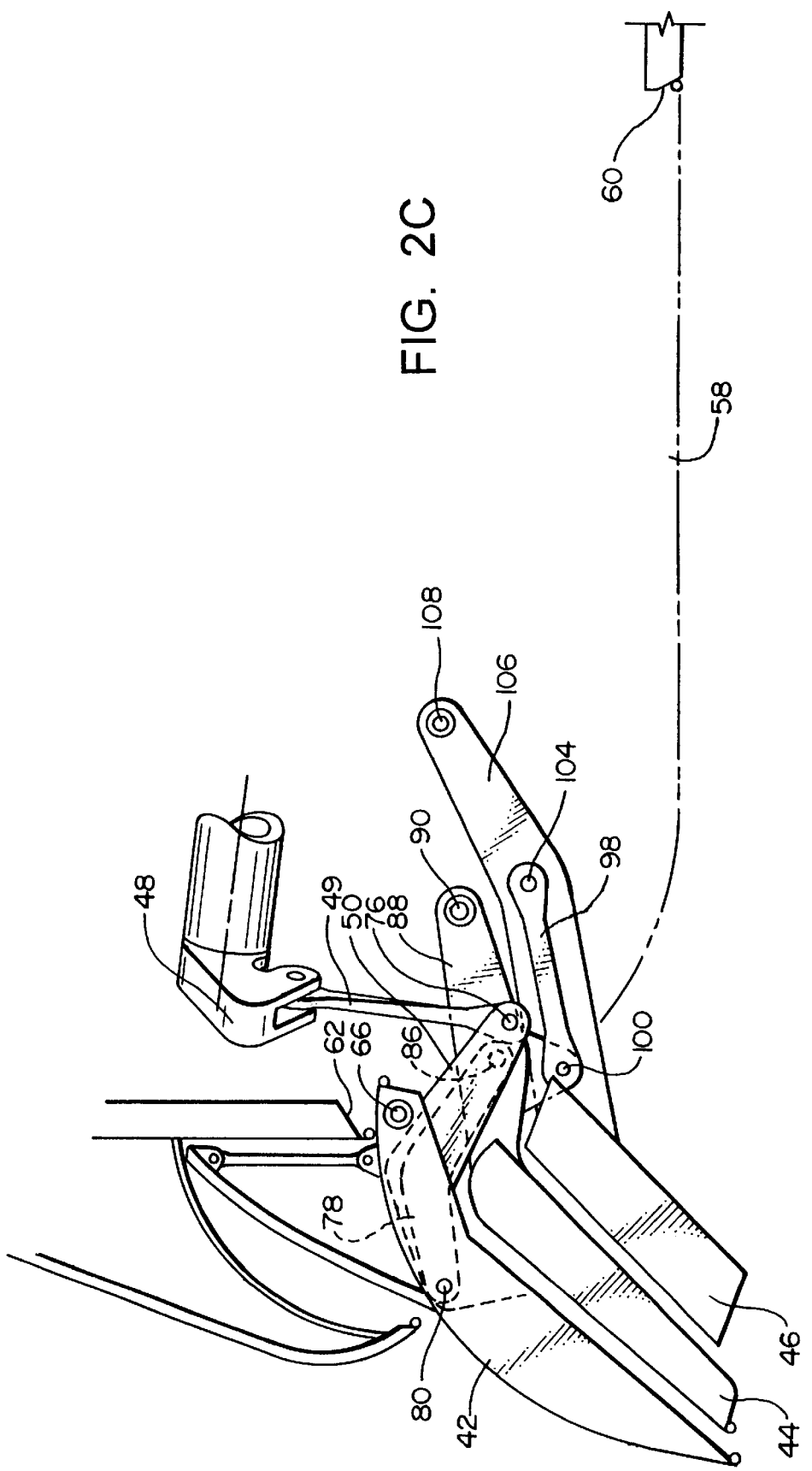

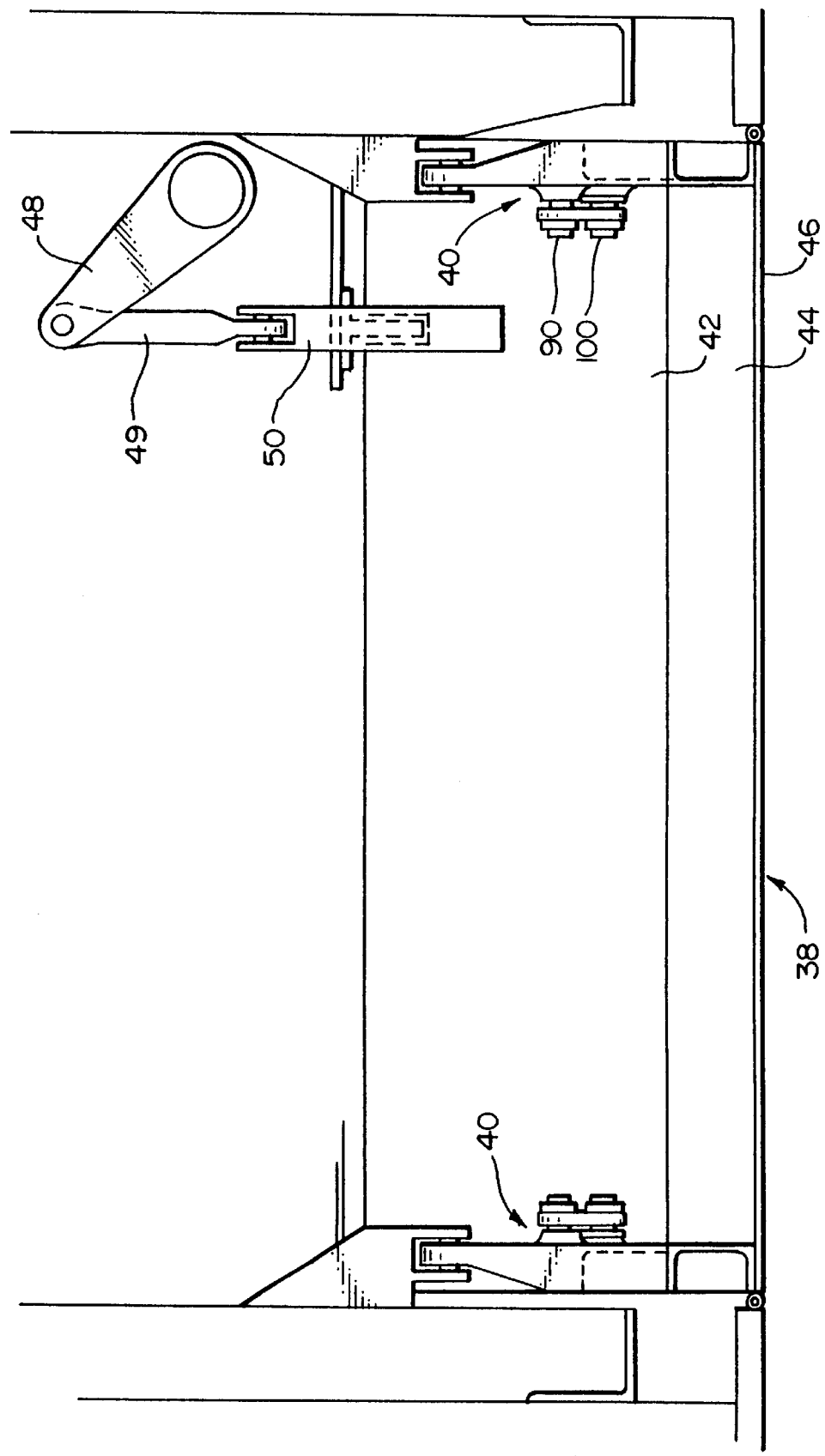

LINKED MULTI-SEGMENT LANDING GEAR DOOR FOR AIRCRAFT

BACKGROUND OF THE INVENTION a) Field of the Invention

The present invention relates to aircraft landing gear, and more particularly to such a landing gear which is particularly adapted to be used with larger aircraft and provide proper ground clearance and also clearance for inspection and maintenance of the landing gear.

b) Background Art

Airplanes commonly have retractable landing gear, where the landing gear has a stowed position within the airplane structure, and an operating position where the landing gear extends from the airplane structure so that the landing gear wheels can properly engage the ground surface. Accordingly, the fuselage of the airplane (or other body carrying the landing gear) is provided with landing gear well doors which remain closed during flight, but are opened before landing to permit the landing gear to be moved to its operating position for ground engagement upon landing of the airplane.

Proper utilization of space is, of course, very important for most all aircraft. Also, it is necessary to provide the various components of the airplane with proper access and clearance for maintenance, repair, etc. With landing gear, for example, it is desirable that when the airplane is on the ground, the landing gear doors and other components are positioned to provide proper clearance to facilitate wheel inspection and maintenance. Also there are minimum clearance requirements on both sides of the body to accommodate wheel change and supporting equipment.

A search of the patent literature has disclosed a number of devices related generally to aircraft or other transportation vehicles, showing various doors and other closure mechanisms for a variety of purposes. These are the following:

U.S. Pat. No. 2,378,856 (Laddon et al.) illustrates a "sliding closure for aircraft". In FIG. 1, there are shown the closure doors 24 which are flexible and move in tracks from a lower position (on the left side of FIG. 1) to an upper position (right side of FIG. 1). This could be used, for example, for providing a bottom opening for the discharge of bombs. FIG. 4 shows another embodiment where this could be used as a sliding enclosure for a tail gun compartment or "any other access opening".

U.S. Pat. No. 2,445,131 shows a door mounting system for an aircraft where the door moves a short distance laterally in the channels 13–16. When the door is moved to the position in FIG. 3, the several rollers 26 become aligned with an upper channel 35 and the lower channel 36 and then the doors slip laterally to the position of the FIG. 5 to its open position.

U.S. Pat. No. 2,604,281 (McCall et al.) discloses a door structure for a bomb bays in the military aircraft. In FIG. 3, there is shown a linkage by which the two bomb bay doors 7 are moved outwardly to the open position. As can be seen in FIG. 3, the left door 7 pivots about the location 53, and is interconnected to the location 53 by a strut 65. A rod 69 is actuated by the hydraulic actuator 50 to move the arm 66 downwardly to in turn cause the strut 67 to push the door 7 upwardly and outwardly, rotating about the pivot point 73. The right door 70 is connected to an arm 55, the lower end of which connects to the right door 7 and the upper end of which connects at 77 to an actuating linkage connected to the hydraulic actuator 50. When the hydraulic actuator 50 is extended, this moves the upper end of the arm 55 on an arcuate path counterclockwise to open the right door 7.

U.S. Pat. No. 2,658792 (Scott) illustrates a door which is slid from a closed position parallel to the outside contour of the body to a forward position so that it is within the body of the vehicle.

U.S. Pat. No. 2,670,156 (Clark et al.) shows a catapult hook mechanism and FIG. 9 shows the door and the hinge mechanism by which the door 81 is moved. There are two L-shaped strips 86 and 87 pivotally connected at a center location, one being pivotally connected at 90 structure, and the other end at 95 to the door panel. The second member is mounted at 94 at a slot and has a pivot connection 92.

U.S. Pat. No. 2,921,501 (Parot) relates to a system for an aircraft to release a load, such as bombs. FIG. 5 shows a mechanism for opening the two lower doors 2. There is provided a pair of arms which are actuated by the member 7. Each of the doors has two rollers which fit in respective curved tracks 29 and 30 to move the doors out of their closed position, then rotate these upwardly to the position within the fuselage, such as shown in the broken lines at the left of part of FIG. 5.

U.S. Pat. No. 3,174,712 discloses a hold door for an aircraft. This is designed so that the door can have a circular cross sectional configuration to conform to the contour of the fuselage. The door member 6 and 7 are mounted in sideways so that these can move from the closed position in a circular path upwardly along the outside of the fuselage.

U.S. Pat. No. 2,486,721 (Miczinski) shows a closure flap assembly for a lift drive mechanism in an aircraft. There are two flaps I and 6. The forward flap is pivotally located at a forward location and is rotated about that pivot location by a link 4 which rotates counterclockwise (see FIGS. 1–3) to move the door from the closed position (FIG. 1) to the open position (FIG. 3). The swing end of the link 4 is connected by the link 5 to a member 14 which connects to the rear flap 6. Movement of the link 5 causes the flap 6 to move linearly in a slot 10, and it is also connected by a link 12 to cause a rotating motion of the flap 6 so that it is located in its open position (FIG. 3) to extend downwardly.

U.S. Pat. No. 3,506,223 (Flemming) discloses an airplane having a lifting drive with two flaps which are moved from a closed position (FIG. 1) through an intermediate position (FIG. 2) into an open position (FIG. 3). The member 5 is attached pivotally to two arms 6 and 7 positioned and configured so that the flap 5 swings downwardly and rotates. The forward flap 4 is fixedly connected by the member 12 to a pivot location. The member 12 and the link 6 are interconnected by a link 13, and are driven by a linear actuator.

U.S. Pat. No. 3,585,757 (Ritchie et al.) discloses a passenger door for an aircraft which is adapted for use in high altitude flights where the cabin is pressurized. To open the door, the door is moved inwardly and upwardly and travels on tracks that have a non-constant curvature and extend upwardly.

U.S. Pat. No. 3,718,171 (Goodwin) shows a door for an aircraft, and more particularly for the cargo hold of the aircraft, where the door is made in two sections pivotally connected to one another. The door is hinge mounted at its upper end, and there are intermediate jacks 26 at the location of the hinge connection for the two door sections to provide limited movement of the two door sections relative to one another when the door moves to its open position.

U.S. Pat. No. 2,457,625 (Amiot) discloses a means for controlling the closing and opening of two lower doors P.

The two doors are moved from the closed position (FIG. 1) to an intermediate position where the outer edges of the door are lifted upwardly by the arms 7 moving vertically, and then the arms 7 move circularly about center axis 11 to rotate the doors to the stowed position of FIG. 3 within the fuselage.

U.S. Pat. No. 2,731,221 relates to an aircraft door installation for high speed aircraft, particularly the type from which bombs or other loads are dropped in flight. There are right and left door sections, with each section comprising two door panels pivotally mounted to one another at 14. The outer door section is hinge mounted to the aircraft structure at its upper outer pivot location 13. An arm 15 extends upwardly to a pivot location, and the lower end is pivotally mounted to the inner door. As each door section is moved outwardly and upwardly, the two panels of each section rotate toward one another and in the fully open position the outer door is above the inner door, and both extend laterally outward from the aircraft.

U.S. Pat. No. 5,181,677 (Kaplin et al.) discloses a door assembly for an aircraft where there is a sliding door secured by tracks and is moved laterally between its open and closed position.

It is an object of the present invention to provide an improved landing gear door assemblies having a desirable balance of operating features, and which are particularly adapted to provide proper clearance for the landing gear, maintenance, and tire replacement and repair, while yet maintaining proper effective operation to meet the overall requirements of the aircraft.

SUMMARY OF THE INVENTION

The door assembly of the present invention is arranged to be used in conjunction with the landing gear of an airplane, where the landing gear has a stowed position in the airplane and an operating position. The airplane has a landing gear door opening which is defined at least in part by first and second door opening edge structures, through which the landing gear travels on a travel path moving between its stowed an operating positions.

In a first and second embodiment, the door assembly comprises first a panel section comprising at least first and second panels, each of which has first and second side edges and an alignment plane extending between the first and second side edges. The panels have a closed position where the panels are positioned side by side to extend across at least a portion of the door opening.

There is also a positioning section operatively connected to the panel section to move the panels from the closed position to an open position where the panels are in proximity with one another, with the alignment planes at least partially overlapping one another and the panels being clear of the traveling path of the landing gear.

This first and second panel each have an outside surface which in the closed position is facing ambient atmosphere, and an inside surface. The positioning section is arranged so that the first and second panels are moved to the open position where the inside surface of one of the panels is adjacent to the outside surface of the other of the panels.

In a preferred form, each of the first and second panels is fixedly attached to first and second mounting arms, respectively, and a second end connected to its related panel. Each panel moves from its closed position to its open position by traveling rotatably about the fixed pivot location of its related mounting arm.

In a preferred form, the panels and there related mounting arms are arranged to rotate in a direction away from the second edge structure and toward the first edge structure, and each mounting arm in the closed position of the panels extends from its related panel in a direction away from the second edge structure to its related pivot location which is spaced from its related panel away from the second edge structure.

More specifically, when the panels rotate from the closed position to an intermediate position, the two panels are positioned below their related pivot locations, and when the panels are moved to the open position, the panels are further from the second edge structure than their related pivot locations. Also in a preferred configuration, the first and second arms are connected by a connecting link having a first link pivot connecting end connected to the first mounting arm at a location spaced from its related arm pivot location, and a second link pivot connecting end connected to the second arm at a location spaced from its related arm pivot location. Also, the first and second ends of the connecting link are positioned from their related arm pivot locations by approximately equal distances. Further, the arm pivot locations are spaced at a distance approximately equal to spacing of the link pivot locations. In this manner, the first and second pivot locations and the first and second connecting locations of the link form a parallel linkage.

In this first embodiment, there is a third panel having an alignment plane and first and second side edges. The first, second and third panels are positioned, in the stowed position, so that the three panels extend across the door opening. The positioning section is arranged to move the third panel to a location having its alignment plane overlapping with an alignment plane of at least one of said first and second panels.

In a preferred form, the third panel comprises a rigid panel component having first and second edge portions. The first edge portion has a pivot connection to said first edge structure and pivots about the pivot connection of the first edge structure between the open and closed positions.

There are operative linkage connections between the first, second and third panels, and there is an actuator connected to at least on of said panels to cause rotation of the connected panel and thus cause rotation of the other two panels. In this specific embodiment, the actuator is connected to the third panel.

In this first arrangement in the airplane, the door assembly described above is positioned at a side location of a fuselage of the airplane, and the third panel section is positioned at a furthest outward position from the center of the fuselage, relative to the first and second panels. The three panels are arranged so that in the closed position, these extend from the side portion of the airplane toward the center, and in the open position, they are positioned at the side of the airplane and extend laterally outwardly from the side of the airplane.

In the third embodiment, the first and second panels, having outside surfaces and inside surfaces, are arranged relative to the positioning section so that in moving the panels from the closed position to the open position, the inside surfaces of the two panels are in the open position facing one another, and the alignment planes of the two panels are at least partially overlapping.

More specifically these panels of the second embodiment are hinge connected along adjacent side edges, and in the open position, the two panels are rotated toward one another during deployment to the outer position so that the inside surfaces of the two panels face one another.

Desirably, in the third embodiment, the panels are hinge connected along adjacent side edges, and in the open position, the two panels are rotated toward one another during deployment to the open position so that the inside surfaces of the two panels face one another.

The positioning section of this third embodiment comprises a main positioning arm which is pivotally mounted about a fixed pivot location. The fist and second panels are operatively connected to the arm so as to be carried rotatably by the arm from the closed position toward the open position. The positioning section further comprises a positioning linkage bound to the arm and interconnected to at least one of the panels so as to cause said one of the panels to rotate relative to the other of said panels.

Also, the positioning section of the second embodiment has a secondary positioning link having one pivot end attached to fixed structure and a having a second end operatively connected to the positioning linkage so that with rotation of the main positioning arm, the secondary positioning arm causes movement of at least one link of the positioning linkage.

In another embodiment, the landing gear door assembly comprises first and second panel sections, each of which comprises at least first and second panels. Each of these first and second panels has first and second side edges and an alignment plane extending between the first and second side edges. The panels have a closed position where the panels of the two panel sections are positioned in side by side alignment and cross the door opening.

The present invention further comprises a landing gear door apparatus where there are first and second landing gear door assemblies. First door assembly comprises a first panel section comprising at least first and second panels. The panels have a closed position where the panels are positioned side by side to extend across at least a portion of the door opening region. There is a first positioning section operatively connected to the first and second panels to move said panels from a closed position to an upper open position where the first and second panels are in proximity with one another. There is a second landing gear assembly which comprises a second panel section having third and fourth panels. The third and fourth panels have a closed position where the panels extend across at least a portion of the door opening region.

There is a second positioning section operatively connected to the second section to move the panels from the closed position to a lower open position where the third and fourth panels are in proximity with one another, and positioned below said first and second panels in their open position.

In the method of the present invention, there is provided a door closing assembly as described above, comprising at least the first and second panels. Initially, the panels are positioned in a closed position where they are in side by side relationship across at least a portion of the door opening. Then a positioning section is utilized to move the panels from the closed position to the open position so as to be in proximity to one another, with the alignment planes at least partially overlapping one another. Further, the panels are clear of the traveling path of the landing gear.

Other features of the present invention will become apparent from the following detailed description.

BRIEF DESCRIPTION OF THE DRAWINGS

FIG. 1 is a transverse sectional view showing somewhat schematically one half of the airplane (divided along the vertical longitudinal center plane), and showing three sets of the airplane's landing gear in their downward operating position.

FIGS. 2A, 2B and 2C are sectional views illustrating a first embodiment of the door assembly of the present invention, and three successive positions, FIG. 2A in the closed position, FIG. 2B in the intermediate position, and FIG. 2C in the fully open position;

FIG. 3 is a side elevation view, partly in section, showing the door assembly in an intermediate position, and also the actuating and positioning mechanism on opposite sides of the door assembly;

DESCRIPTION OF THE PREFERRED EMBODIMENTS

Figure 2A:
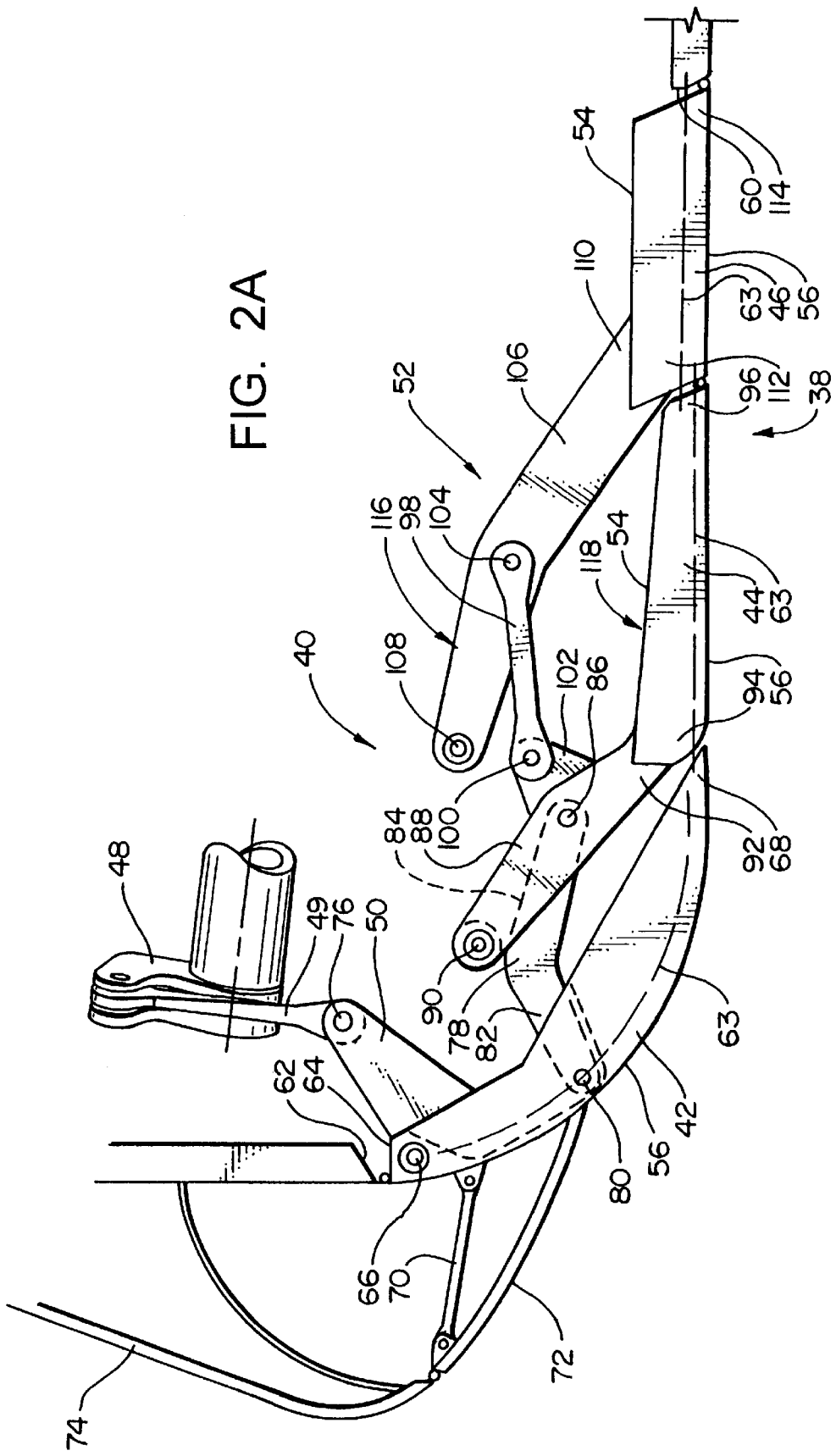

With reference first to FIG. 1, there is shown an airplane 10 (only the left half of the airplane being shown) this airplane 10 comprising a fuselage 12, a wing 14 and a landing gear assembly set 15. Three of the landing gear assemblies are shown in FIG. 1, namely a middle body gear 16 (only half of which is shown), a side mounted body gear 18, and a wing mounted body gear 20. The fuselage 22 has a longitudinal axis 22.

In each landing gear assembly there is a set of wheels 24, a mounting structure 26 and a positioning mechanism 28 by which the landing gear is moved between its deployed or operating position and its stowed position in the wheel well.

For each landing gear assembly, there is a door assembly. The present invention is directed particularly toward the design and operation of these door assemblies, and there are three embodiments in the present invention, namely a first embodiment which is the side body door assembly 30, a second embodiment which is the middle body door assembly 32, and the third embodiment which is the wing located door assembly 34.

In the following description the term "inner" or "inward" shall refer to a position spaced laterally from a longitudinal axis 22 of the fuselage 12, and the terms "upper" and "lower" will refer to a vertically oriented direction on location. For movable components, these reference designations will be given when the components are in the position with the doors closed."

There will now be described the first embodiment of the present invention which is the side body door assembly 30. The side body door assembly 30 is shown in the overall view of FIG. 1, and shown more particularly in FIGS. 2A, 2B, 2C and 3.

This door assembly 30 comprises a panel section 38 and a positioning section 40. The panel section 38 comprises three panels, namely an outer panel 42, a middle panel 44, and an inner panel 46. Each of these panels 42, 44 and 46 is a relatively rigid panel, and has an elongate generally rectangular configuration.

The positioning section 40 comprises an actuator 48 which in this particular embodiment is in the configuration of a rotatable crank arm which operates through a link 49 to engage an input lever 50 which is rigidly connected to the outside panel 42. This input lever moves the outside panel 42 in a rotational movement which in turn acts through the linkage section 52 to move the other two panels 44 and 46.

In FIG. 2A, the panel section 38 is in its closed position. Each of the panels 42–46 has an inside surface 54 which faces toward the wheel well, and an outside surface 56 which (with the panels 42–46 in their closed position of FIG. 2A) combine to form an outer aerodynamic surface.

It can be seen that as the actuator 49 rotates to move its drive link 49 downwardly, all three of the panels 42–46 rotate in a clockwise direction (as seen in FIG. 2b where the door assembly 32 is shown), in an intermediate position. As movement of the actuator 48 continues, the three panels 42–46 are moved laterally outwardly to their fully opened position. It can be seen that in this position, the three panels 42–46 are positioned closely adjacent to one another in parallel relationship, and are also positioned clear of the door opening indicated at 58. The lateral edges of this door opening 58 are shown as an inner edge 60 and an outer edge 62.

Each of the panels 42–46 can be considered as having an alignment plane 63 which is generally parallel to the outside surface 56 of that panel 42–46. It can be seen that the two panels 44 and 46 have an alignment plane 63 that is essentially planar, while the alignment plane 63 of the outside panel 42 has a curve along a longitudinal bend line, so that the outer surface 56 of the panel 42 forms approximately a 90 degree curve for proper aerodynamic alignment.

There will now be a more detailed description of each of the panels 42–46 and also the portions of the linkage section 52 related thereto. As described above, in describing the panels 42–46 and the related components of the linkage section 52, the terms "inner", "outer", "upper" and "lower" shall refer to the orientation the panels and their components, in the position shown in FIG. 2A.

Thus, to describe first the panel 42, this panel has an outer and upwardly positioned end portion 64 that is pivotally connected to stationary structure at 66. The opposite end 68 of the panel 42 is, as shown in FIG. 2A, located at a position inwardly of, and below, the pivot location 66. It will be noted that at the outer outside surface 56 of the panel 42, there is a link 70 connected to a panel section 72 of a flap seal fairing 74. As will be explained later, as the panel 42 rotates toward its open position, this linkage will raise the panel section 72 upwardly and inwardly to provide clearance for the panel 42 in its open position.

The aforementioned actuating link 49 has a pivot connection at 76 to the operating end of the lever arm 50. It can be seen that the downward motion of the link 49 causes the panel 42 to rotate (as seen in FIG. 2A) counterclockwise.

There is a connecting link 78 which has an outer that has a pivot connection at 80 to the panel 42 at a location approximately midway between the opposite ends 64 and 68 of the panel 42 (but somewhat closer to the front end 64). This link 78 has a bend at about its mid length at a little bit less than forty five degrees, so that there are two link section 82 and 84, this being done for proper clearance in the operation of the linkage section. The inner end portion of the link 78 connects at 86 to an arm 88 that is pivotally connected at its outer end at a fixed location at 90. The opposite end 92 of the arm 88 is fixedly connected to an outside end portion 94 of the middle panel 44. It Gan be seen in FIG. 2A that in the closed position, the outside end 94 and the inside end 96 of the panel 44 are at approximately the same level so that the outside surface 56 (facing downwardly) of the middle panel 44 is horizontal.

It can be seen that the linkage connection between the outside panel 42 and the middle panel 44 is quite similar to the linkage connection between the middle panel 44 and the inside panel 46. More specifically, there is a link 98 which has an outer pivot location at 100 to a bracket 102 that is fixedly attached to the arm 92 at approximately a center location. The opposite end of the link 98 is pivotally connected at 104 to an arm 106. that is pivotally connected at a fixed location 108. The opposite end 110 of the arm 106 is fixedly connected to a outer end 112 of the inside panel 46. The inner end of the panel 46 is (in the closed position of FIG. 2A) positioned immediately adjacent to the inner edge 60 that defines the inner lateral edge of the door opening 58.

In the operation of this first embodiment 32, there will first be a description of the movement of the various components between the closed and open positions. Then there will be a further description of the operation describing operating relationships of this first embodiment.

To describe the movement of the components of this first embodiment, with reference to FIGS. 2A, 2B and 2C, it can be seen that as the actuator 48 is moved downwardly to move the drive link 49 downwardly, thus causing the rotation of the outside panel about its fixed pivot location 64, the link 78 is pulled by the panel 42 outwardly, with this link 78 acting through its pivot location at 86 to pull the arm 88 outwardly and thus cause the rotation of the arm 88 and the middle panel 44 to which the arm 88 is rigidly connected in a clockwise direction. In like manner, the link 98, being pulled by the arm 88 at the pivot location 100 pulls at the pivot location 104 of the arm 106, to rotate the arm 106 and the inside panel 46 in a clockwise direction.

As the actuator 48 continues its downward movement, this causes further rotation of the panels 42, 44 and 46 until they reach the fully open position of FIG. 2C. It can be seen that in the position of FIG. 2C the panels 42, 44 and 46 are positioned closely to one another, the bent configuration of the link 82 permits it to fit within a recess in the inner portion of the outside panel 42, and also the middle panel 44 to be positioned more closely to the panel 42. Also, it will be noted that the arm 106 has a slightly bent configuration to permit the arm 106 to fit closely adjacent to the arm 88 and also enable the panels 44 and 46 to be closely adjacent to one another in the open position of FIG. 2C.

In the position of FIG. 2C, the panel section 38 is fully open, and the landing gear can be moved downwardly to its deployed position, as shown in FIG. 1. When the airplane has again taken off and is a sufficient distance above the ground level, then the landing gear 16 can be retracted into the wheel well, and the actuator 48 is moved the opposite direction to cause the door section 38 to move back to the closed position of FIG. 2A.

With reference to FIG. 3, it can be seen that one positioning mechanism 38 of the side body landing gear 16 is located at the right end of the panel section 30 (as seen in FIG. 3), and the other one of the positioning sections 40 is at the other end. The actuator 28 of the door assembly can be slave linked to the actuator for lowering and raising the landing gear so that the movement of the door assembly 30 between its open and closed position is properly coordinated with the movement of the landing gear 16 between its operating and stowed position. The panels 42 and 44 are sufficiently stiff so that the movement of the right positioning section 40 acts through the panels 42, 44 and 46 to cause the other positioning section to move in the same manner. In FIG. 3 the door assembly 30 is shown in its intermediate position at FIG. 2B, and the lower part of the panels 44 and 46 can be seen.

With the movement of the components of the first embodiment having now been described, the functional relationships will now be described with reference to FIG. 2B. For convenience, all of the numerical designations that are given in 2A are not given in FIG. 2B. Rather, there are numerical designations for the various pivot locations of the linkage and only a few of the more relevant numerical designations.

The inner panel 46 with its arm rigidly attached thereto is designated the "inner panel component 116", the intermediate panel 44 with its arm 88 is designated the "middle panel component 118", and the panel 42 for purposes of this discussion will be called the "panel component 120".

It can be seen that the two panel components 116 and 118 with the fixed pivot locations 90 and 108 and the two pivot locations 100 and 104 comprise what could be described as a parallel linkage. In the all three positions of FIGS. 2A, 2B and 2C, these pivot locations 90, 108, 104 and 100 define a parallelogram, and in FIG. 2B come very close to being in the form of a right angle parallelogram. It can be seen in the closed position of FIG. 2A, these same four pivot locations form a parallelogram which could be described in a more "collapsed" position, with the line 90/108 defined by the pivot locations 90 and 108 being closely adjacent to the line 100/104 defined by the points 100 and 104 being closely adjacent to one another, and with the lower line 100/104 be moved further laterally inwardly. In the location of FIG. 2A, the two panels 44 and 46 are substantially horizontal and aligned with one another.

With reference to FIG. 2B, it will be noted that the panel 46 can be considered as having an alignment plane 122 parallel to its lower surface, and likewise the panel 44 has an alignment plane 124 parallel to its lower surface. It will also be noted that the alignment plane 124 is aligned so that in the position of FIG. 2A, it is moderately below the pivot location 108 and the panel 46 is laterally inward the pivot location 108. The alignment plane 119 is similarly positioned relative to its pivot location 90. Then it can be seen that in the fully open position of FIG. 2C the parallelogram defined by the points 90, 108, 104 and 100 also has the configuration of a "collapsed" parallelogram, but with the points 100 and 104 positioned further outwardly, respectively, relative to the points 108 and 90.

Thus, in the closed location of FIG. 2A the overall "envelop" occupied by the panels 42, 44 and 46 and by the related linkage is relatively small, thus providing ground clearance. In like manner, in the open position of FIG. 2C, the panels 42, 44, and 46 are positioned closely adjacent to one another, well outwardly of the door opening 58, and at a level just slightly below that of the lower part of the fuselage.

It will also be noted that the distance from the fixed pivot location 108 to the end connection location 110 at the panel 46 is longer than the distance from the fixed pivot location 90 to the connecting location 92 to the panel 44 and that the length of the panel component 116 (as can be seen in FIG. 2B) is longer than that of the panel component 118. Thus, it will be noted that in the closed position of FIG. 2A, the pivot location 108 is positioned a substantial distance from the edge 60 of the door opening, due to the total length of the panel component 116 made up of the panel 46 and the arm 106 having greater length. Yet in the open position of FIG. 2C the two panels 46 and 48 are closely adjacent to one another with the inner edge portions (positioned at an outward location of FIG. 2C) are nearly the same height and provide substantial ground clearance.

It will also be noted that the four pivot points 66, 90, 86, and 80 also are the pivot points of a parallel linkage made up of the fixed structure between the points 66 and 90, the arm portion 88 between the pivot locations 86 and 90, the interconnecting link 78, that portion of the outer panel 42 between the points 80 and 86. This parallel linkage defined by the end point 66, 90, 86 and 80 functions in substantially the same way as the parallel linkage defined by the end points 90, 108, 104 and 100, with the general alignment axis of the outer parallel linkage (66, 90,86 and 80) being slanted upwardly and outwardly to a slight extent, while the other parallel linkage defined by the points 90, 108, 104 and 100 being more horizontal.

With these relationships, the benefits of being compact in the stowed and open positions, proper clearances, and effective operation are achieved.

Figure 4A:
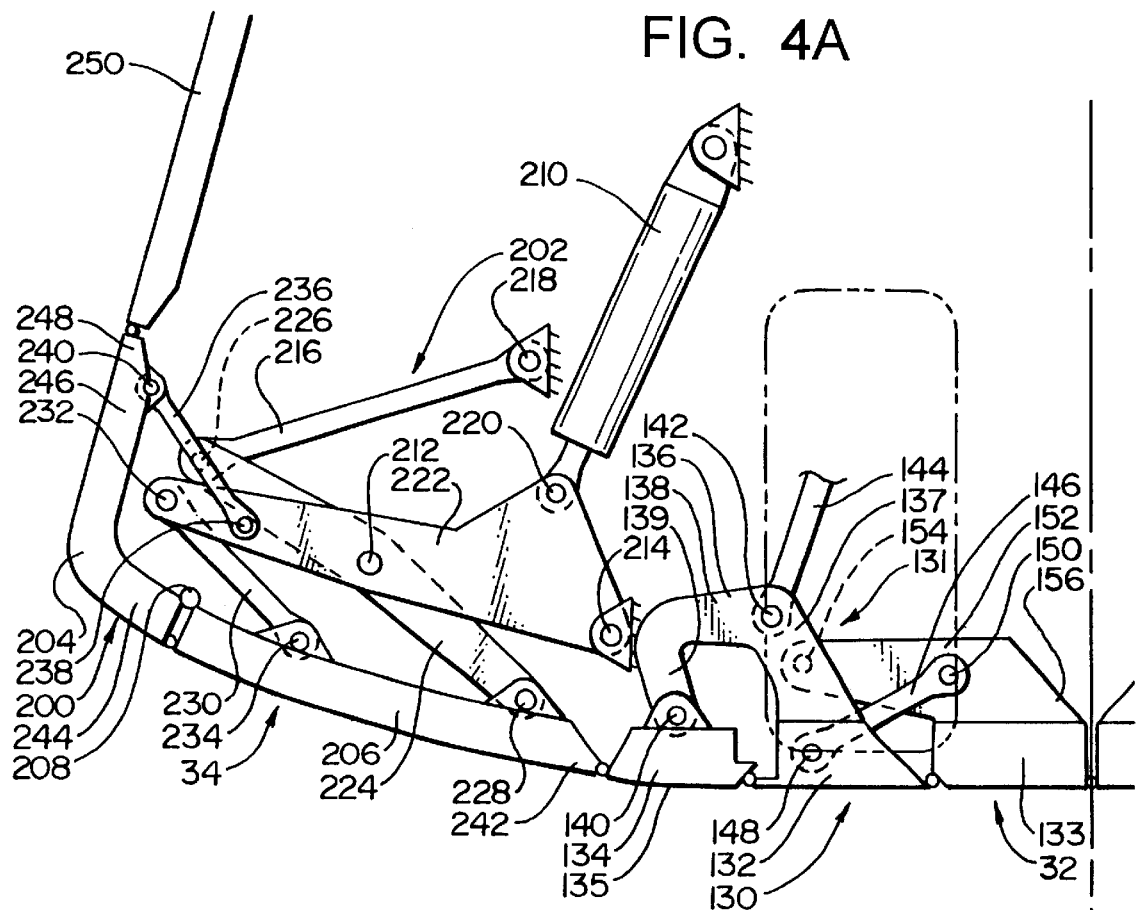
FIG. 4A is a sectional view showing a second embodiment of a door assembly of the present invention, which in the present embodiment is to provide clearance for the wing mounted landing gear, and also showing a third embodiment of the present invention which is a landing gear door assembly for the center positioned landing gear.
Figure 4B:
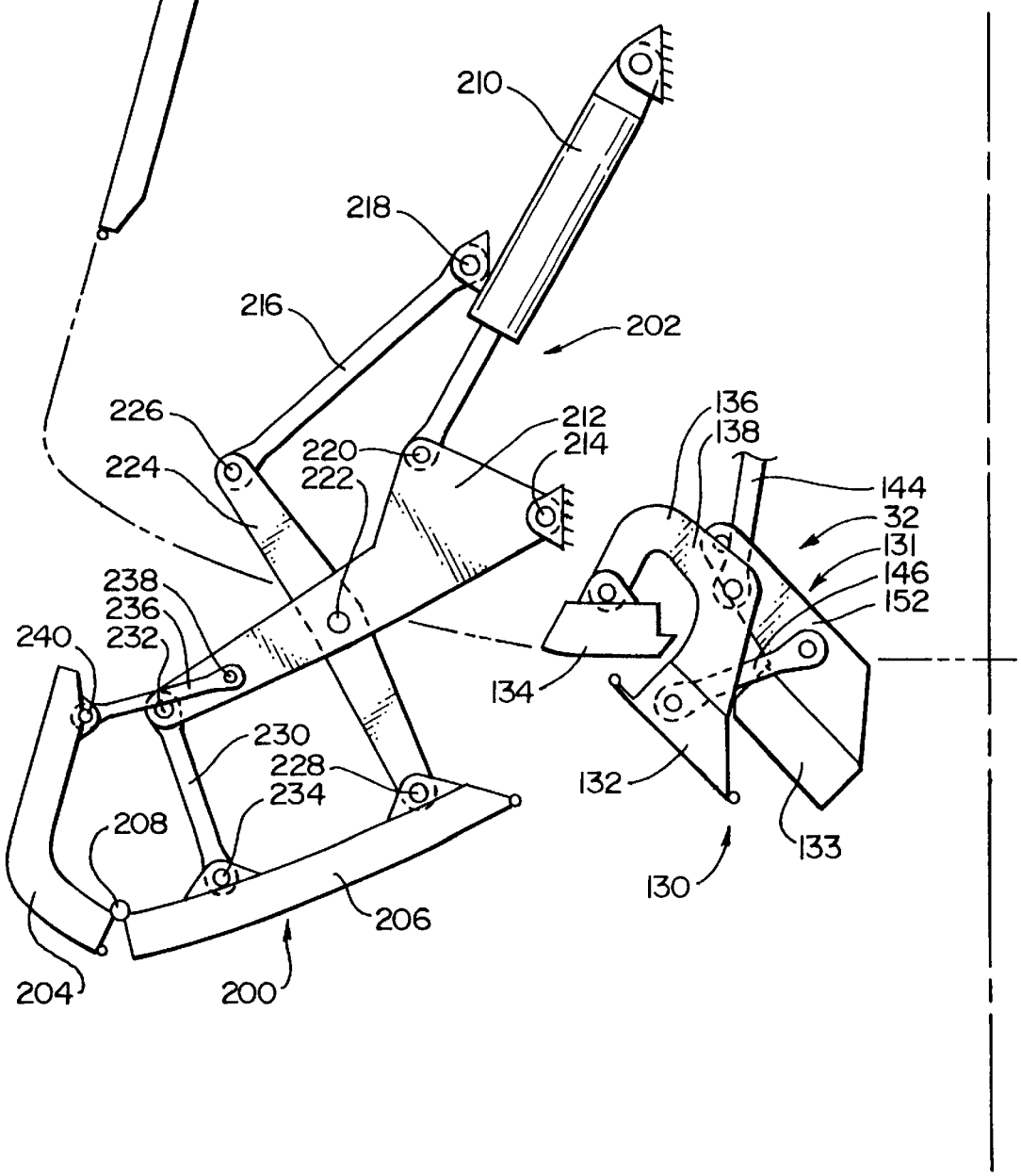
FIG. 4B shows the second and third embodiments of FIG. 4A in the intermediate position.
Figure 4C:
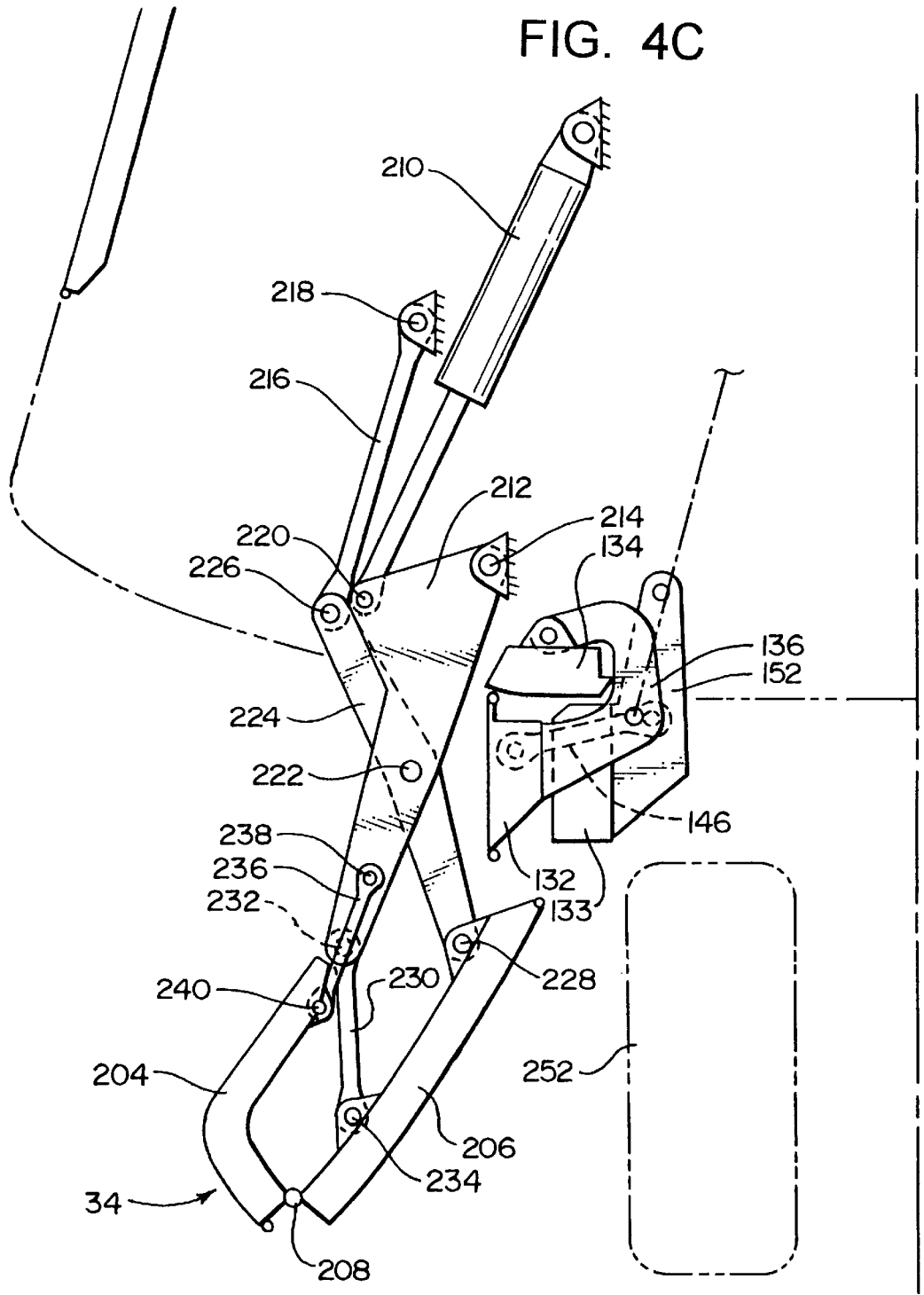
FIG. 4C shows the second and third embodiments in their fully open position.

The second and third embodiments of the present invention are shown in FIGS. 4A, 4B and 4C. The second embodiment comprises the central door assembly 32, and the third embodiment is the outer landing gear door assembly that moves a portion of a flap seal fairing for clearance of the outer wing mounted landing gear 20. These two embodiments which are illustrated in 4A, 4B and 4C cooperate with one another to provide certain operating benefits and together they can be considered as a combined embodiment.

To now describe the second embodiment, the door assembly 32 comprises a panel section 130 and a positioning section 131. The panel section 130 comprises an outer panel 132 and an inside panel 133. There is a structural fuselage portion 134 positioned immediately outwardly of the outer panel 132, and this has a bottom surface 135 which is part of the outer aerodynamic surface of the fuselage.

Pivotally mounted to this structure 134, there is an arm 136 having a generally U-shaped configuration. This arm 136 has an arm portion 137 which is fixedly connected to the outer panel 132, a middle connecting section 138, and a third section 139 that is pivotally connected at 140 to the aircraft structure at 128. The arm 132 has another pivot connection 142 located at the juncture of the arm portions 131 and 132. A drive rod 144 is connected to this pivot connection 142.

There is a connecting link 146 which has a first pivot connection at 148 to the outer panel 132 and a second pivot connection 150 at its opposite end which is at an intermediate location to an arm 152. This arm 152 in turn has a pivot connection at 154 to fixed structure, and its opposite end 156 is fixedly connected to the inner panel 133.

To describe the operation of this second embodiment, to move the panel section 130 from its closed position of FIG. 4A to its open position of 4C, the drive link 144 is moved downwardly against the pivot location 142 to cause the arm 132 to rotate clockwise (as seen in FIGS. 4A–4C) and thus cause the outer panel 132 to rotate about the pivot location 140. At the same time, the link 146, being pivotally connected at 148 to the outer panel 140 is pulled downwardly and somewhat outwardly to cause the arm 152 with the panel 133 to rotate downwardly and somewhat outwardly. FIG. 4B shows the panel section 130 in its intermediate position, and as the downward movement of the link 144 continues, the two panels 132 and 133 reach a position where they are vertically aligned and positioned adjacent to one another. The portion 139 of the arm 131 is nearly horizontal, and the arm 152 that is connected to the inside panel 133 is nearly vertical. Thus, the central landing gear 18 is able to pass through the doorway to its operating position.

The door assembly 34 of the third embodiment of the present invention will now be described with reference to FIGS. 4A–4C. This door assembly 34 of the third embodiment comprises a panel section 200 and a positioning section 202. The panel section 200 comprises an outside panel 204 and an inside panel 206, these being connected to one another at a hinge connection 208.

The positioning section 202 comprises a linear actuator 210 and a main positioning arm 212. This positioning arm 214 is mounted at a stationary inner end pivot location 214 and in the stowed position of the FIG. 4A extends outwardly therefrom. There is also a secondary positioning arm 216 which is mounted to a fixed pivot location at 218 located upwardly and a moderate distance outwardly of the pivot location 214. In the stowed position, this secondary positioning arm 216 extends from its pivot location 218 outwardly, with a moderate downward slant.

The main positioning arm 212 has a drive pivot location at 220 which is located upwardly and moderately outside of the fixed pivot location 214. The main positioning arm 212 also has a mid pivot location 222 at approximately the mid length of the arm 212 that is connected to an intermediate positioning link 224 at a location approximately half way between the two end portions of the intermediate positioning link 224. An outer end of the positioning link 224 has a drive pivot location at 226 where it connects pivotally to an outer end of the secondary positioning arm 216. At the opposite end of the link 224 there is a positioning pivot end 228 that is connected to an inner end of the inside panel 206.

There is an end link 230 which has a first outside end pivot location at 232 which pivotally connects to the outer end of the main positioning arm 212. The end link 230 connects at its inside end (in the stowed position relative to the stowed position of FIG. 4A) to an outer end portion of the inside panel 206 a short distance inwardly of the hinge connection 208.

There is an outer panel positioning link 236 pivotally connected at 238 to the main arm 212 at a location between the connecting locations 222 and 232. A second end of the link 236 is pivotally connected at 240 to an upper end of the outside panel 204.

To describe the operation of this third embodiment, it can be seen that in the stowed position of FIG. 4A, the inside panel 206 has its inner end 242 positioned adjacent to the fixed structure 128 (identified in the description of the second embodiment) and extends in the stowed position outwardly with an upward slant. The outside panel 204 has a first inner panel portion 244 that in the stowed position of FIG. 4A is aligned with the panel 206 in a near horizontal position. The outside panel 204 has a second panel portion 246 which extends (in a stowed position of FIG. 4A) upwardly and inwardly from the outside edge of the panel portion 244 and its upper end 248 is, in the stowed position, against and aligned with the outside fairing 250.

The positioning section 202 can be considered as having three main functions. The first function is to move the panel section 202 (including both panels 204 and 206) downwardly and inwardly to the open position. This is accomplished essentially by the main positioning arm 212 moving about its pivot location 214 by the linear actuator 210 causing movement of the pivot location 220 about the pivot location 214. Thus, it can be seen that initially the main arm 212 is an upper generally horizontally aligned stowed position, and in the position of the fully deployed position of 4C is extending substantially downwardly.

The second function of the positioning section 202 is to superimpose on the downward and inward motion of the main arm 212 an additional movement where the panel 206 in the fully open position is rotated to a generally vertical location where it is positioned more closely to the main arm 212. This motion is accomplished by the action of the secondary positioning arm 216, the intermediate positioning arm 224, the end link 230, and also the outer portion of the main arm 212.

To explain this more completely, it can be seen that the outer portion of the main arm 212 (extending between the pivot locations 222 and 232), the inner portion of the intermediate positioning link 224 (extending between the pivot locations 222 and 228), the structure of the panel 206 (extending between the pivot locations 228 and 234), and the end link 230 (extending between the pivot location 234 and 232) comprise essentially a parallel linkage. Thus, it can be seen in the stowed position in FIG. 4A, this parallel linkage is generally formed in a "flattened" parallelogram in a manner that the panel 206 is at a relatively close position relative to the main arm 212. Thus in the stowed position, the overall positioning linkage occupies a relatively smaller amount of space.

Then in the intermediate position of FIG. 4B, it can be seen that this parallel linkage (extending between the pivot locations 222, 228, 234, and 232), is more in the form of a rectangle, with the panel 206 being positioned further away from the main positioning arm 212. Then, when there is further motion from the intermediate position of FIG. 4B to the fully open position of FIG. 4C, the parallel linkage (again, extending between the pivot locations 222, 228, 234 and 232) is in more of the form of a parallelogram where the panel 206 is more closely adjacent to the main positioning arm 212.

The movement of the panel 204 is a result first of the rotation of the main arm 212 about the pivot axis 214, and also the movement of the aforementioned parallel linkage (defined by the pivot locations 222, 228, 234 and 232) moving the panel 206 to its deployed position in FIG. 4C, and thus moving the hinge location 208. Then the positioning of the panel 204 to rotate about its pivot connection at 208 is a result of the rotation of the arm 212 and of the action of the positioning link 236.

More specifically, as can be seen by examining FIGS. 4A, 4B, and 4C, as the arm 212 rotates and causes the downward, inward and rotational movement of the panel 206, the hinge location 208 moves away from the main arm 212, thus causing the panel 204 to rotate about the hinge 208, and to cause the pivot connection 240 of the panel 204 to rotate about the pivot location 238 on the main arm 218. The effect of this is the downward and rotational movement of the panel 204 so that in the fully open position of FIG. 4C, this panel 240 has its outer end location adjacent to the end of the main arm 212, and has its upper portion aligned with, and spaced a short distance away from the panel 206.

It was mentioned earlier in this text that the second and third embodiments cooperate with each other in a rather unique way so that these can be considered a "combined embodiment." This is best illustrated in FIG. 4C, where it can be seen that the two panels 204 and 206 of the third embodiment are positioned closer to the ground level than the panels 132 and 133 of the second embodiment. Further, it can be seen that the door panels 132 and 133 are positioned closely adjacent to the arm 212 and the arm 224, and also above the panels 212 and 224. Thus, this permits the two door assemblies 32 and 34 to be positioned, relative to one another in the open position, so as to minimize the space occupied and also provide full access for maintenance, tire change, etc.

It is to be recognized that various modifications could be made in the present invention without departing from the basic teachings thereof. It is also to be understood that while a specific combination of linkages and linkage configurations are shown herein to achieve certain movements of the operating components, it is to be understood that other arrangements of such components or combination of other components could be substituted to perform the basic functions as described herein. Therefore, it is to be understood that within the broader scope of the present invention, these other possible components and combinations of components are considered to be within the scope of the broader claims to the present invention.

What is claimed is:

1. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
   a) a panel section comprising at least first and second panels, each of which has first and second side edges and an alignment plane extending between the first and second side edges, said panels having a closed positioned where the panels are positioned side by side to extend across at least a portion of said door opening;
   b) a positioning section operatively connected to said panel section to move said panels from the closed position to an open position where the panels are in proximity with one another, with the alignment planes at least partially overlapping one another and said panels are clear of the travel path of the landing gear;
   c) said first and second panels each having an outside surface which in the stowed position is facing ambient atmosphere, and an inside surface, said positioning section being arranged so that the first and second panels are moved to the open position where the inside surface of one of said panels is adjacent to the outside surface of the other of said panels;
   d) each of said first and second panels being fixedly attached to first and second mounting arms, respectively, each of which has a first end pivotally mounted at an arm pivot location, and a second end connected to its related panel, and each panel moving from its closed position to its open position by traveling rotatably about the arm pivot location of its related mounting arm.

2. The door assembly as recited in claim 1, wherein the panels and their related mounting arms are arranged to rotate in the direction away from the second edge structure and toward the first edge structure, and each mounting arm in the closed position of the panels extends from its related panel in a direction away from the second edge structure to its related pivot location which is spaced from its related panel away from the second edge structure.

3. The door assembly as recited in claim 1, wherein said panels rotate from the closed position to an intermediate position where the two panels are positioned below their related pivot locations, and when moved to the open position, the panels are further from the second edge structure than their related pivot locations.

4. The door assembly as recited in claim 1, wherein the first and second arms are connected by a connecting link having a first link pivot connecting end connected to the first mounting arm at a location spaced from its related arm pivot location, and a second link pivot connecting end connected to the second arm at a location spaced from its related arm pivot location.

5. The door assembly as recited in claim 4, wherein the first and second ends of the connecting link are positioned from their related arm pivot locations by approximately equal distances.

6. The door assembly as recited in claim 5, wherein said arm pivot locations are spaced at a distance approximately equal to spacing of the link pivot locations, whereby the first and second arm pivot locations and the first and second connecting locations of the link form a parallel linkage.

7. A landing gear door assembly for first and second landing gear located on opposite sides of a longitudinal center axis of an airplane, where each landing gear has a stowed position in the airplane and an operating position, said airplane having first and second landing gear door openings, each of which is defined at least in part by a first outer and second inner door opening edge structures, and through which each landing gear travels on a travel path moving between its stowed and operating positions, said door assembly comprising:
   a) first and second panel sections located on opposite sides of the airplane, each of which comprises at least first outer panel and a second inner panel, each of which panels has first and second side edges and an alignment plane extending between the first and second side edges, said panels having a closed position where the panels of the two panel sections are positioned in side by side alignment across said door opening;
   b) first and second positioning sections operatively connected to said first and second panel sections, respectively, to move the two panel sections from the closed position away from each other to open positions where both the first and second panels of each panel section are located laterally outwardly of the travel path of its related landing gear, and where the first and second panels of each panel section are in proximity with one another, with the alignment planes at least partially overlapping one another and said panels are clear of the traveling path of the landing gear.

8. The door assembly as recited in claim 7, wherein said first and second panels of each section each have an outside surface which in the stowed position is facing outside air, and an inside surface, said positioning sections being arranged so that the first and second panels of each panel section are moved to the open position where the inside surface of one of said panels is adjacent to the outside surface of the other of said panels.

9. The door assembly as recited in claim 8, wherein each panel is fixedly attached to a mounting arm which has a first end pivotally mounted at an arm pivot location, and a second end connected to its related panel, and each panel moves from its closed position to its open position by traveling rotatably about the fixed pivot location of its related mounting arm.

10. A landing gear door apparatus for two landing gears of an airplane, where each landing gear has a stowed position in the airplane and an operating position, said airplane having a landing gear door opening region through which each of the landing gear travels on a travel path moving between its stowed and operating positions, said apparatus comprising:
   a) a first landing gear door assembly comprising:
      i. a first panel section comprising at least first and second panels, said panels having a closed position where the panels are positioned side by side to extend across at least a portion of said door opening region;

ii. a first positioning section operatively connected to said panel section to move said panels from the closed position to an upper open position where the first and second panels are in proximity with one another.
b) a second landing gear door assembly comprising:
 i) a second panel section comprising at least third and fourth panels, said third and fourth panels having a closed position where the panels extend across at least a portion of said door opening region;
 ii) a second positioning section operatively connected to said second panel section to move said panels from the closed position to a lower open position where the third and fourth panels are in proximity with one another, and positioned lower than said first and second panels in their stowed position.

11. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
 a) a panel section comprising at least first and second panels, each of which has first and second side edges and an alignment plane extending between the first and second side edges, said panels having a closed positioned where the panels are positioned side by side to extend across at least a portion of said door opening;
 b) a positioning section operatively connected to said panel section to move said panels from the closed position to an open position where the panels are in proximity with one another, with the alignment planes at least partially overlapping one another and said panels are clear of the traveling path of the landing gear;
 c) said first and second panels each having an outside surface which in the stowed position is facing ambient atmosphere, and an inside surface, said positioning section being arranged so that the first and second panels are moved to the open position where the inside surface of one of said panels is adjacent to the outside surface of the other of said panels;
 d) said assembly further comprising a third panel having an alignment plane and first and second side edges, said first, second and third panels being positioned, in the stowed position, so that the three panels extend across the door opening, said positioning section being arranged to move said third panel to a location having its alignment plane overlapping with an alignment plane of at least one of said first and second panels.

12. The door assembly as recited in claim 11, wherein said third panel comprises a rigid panel component having first and second edge portions, said first edge portion of the third panel having a pivot connection at said first edge structure and pivots about said pivot connection of the first edge structure between the open and closed positions.

13. The door assembly as recited in claim 11, wherein there are operative linkage connections between said first, second and third panels, and there is an actuator connected to at least one of said panels to cause rotation of the connected panel and thus cause rotation of the other two panels.

14. The door assembly as recited in claim 11, wherein there is an actuator which is operatively connected to said third panel to cause rotation of said third panel.

15. The door assembly as recited in claim 11, wherein said door assembly is positioned at a side location of a fuselage of said airplane, and said third panel section is positioned at a furthest outward position from a center of said fuselage, relative to said first and second panels, said first, second and third panels being arranged so that in the closed position, these extend from the side portion of the airplane toward the center, and in the open position, these are positioned at the side of the airplane and extend laterally outwardly from the side of the airplane.

16. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
 a) a panel section comprising at least first and second panels, each of which has first and second side edges and an alignment plane extending between the first and second side edges, said panels having a closed positioned where the panels are positioned side by side to extend across at least a portion of said door opening;
 b) a positioning section operatively connected to said panel section to move said panels from the closed position to an open position where the panels are in proximity with one another, with the alignment planes at least partially overlapping one another and said panels are clear of the traveling path of the landing gear;
 c) said first and second panels having outside surfaces which are exposed to outside atmosphere when the panels are in their closed position, and inside surfaces, said positioning section being arranged so that in moving the panels from the closed position of the open position, the inside surfaces of the two panels are in the open position facing one another, and the alignment planes of the two panels are at least partially overlapping;
 d) said panels being hinge connected along adjacent side edges, and in the open position, the two panels are rotated toward one another during deployment to the open position, the two panels are rotated toward one another during deployment to the open position so that inside surfaces of the two panels face one another.

17. The door assembly as recited in claim 16, wherein said positioning section comprises a main positioning arm which is pivotally mounted about a fixed pivot location, and said first and second panels are operatively connected to said arm so as to be carried rotatably by said arm from the closed position toward the open position, said positioning section further comprising a positioning linkage mounted to said arm and interconnected to at least one of said panels so as to cause said one of said panels to rotate relative to the other of said panels.

18. The door assembly as recited in claim 17, wherein there is a secondary positioning link having one pivot end attached to fixed structure, and having a second end operatively connected to said positioning linkage so that with rotation of said main positioning arm, said secondary positioning arm causes movement of at least one link of said positioning linkage.

19. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
  a) a panel section comprising at least first and second panels, each of which has first and second side edges, said panels having a closed positioned where the panels are positioned side by side to extend across at least a portion of said door opening, with the first edges of the first and second panels being closer to the first edge structure than the second edges of the first and second panels, respectively;
  b) a positioning section operatively connected to said panel section to move said panels from the closed position toward the first edge structure to an open position where the panels are both on the same side of the travel path and said panels are clear of the travel path of the landing gear.

20. The door assembly as recited in claim 19, wherein said first and second panels each have an outside surface which in the stowed position is facing ambient atmosphere, and an inside surface, said positioning section being arranged so that the first and second panels are moved to the open position where the inside surface of one of said panels and the outside surface of the other of said panels are facing toward one another.

21. The door assembly as recited in claim 19, wherein each of said first and second panels is mounted for movement along a lateral path along which each panel rotate so that the second edges of the first and second panels rotate downwardly and toward the first edge structure.

22. The door assembly as recited in claim 21, wherein each of said first and second panels is fixedly attached to first and second mounting arm, respectively, each of which has a first end pivotally mounted at an arm pivot location, and a second end connected to its related panel, and each panel moves from its closed position to its open position by traveling rotatable about the arm pivot location of its related mounting arm.

23. The door assembly as recited in claim 19, wherein each of said first and second panels is fixedly attached to first and second mounting second panels have outside surfaces which are exposed to outside atmosphere when the panels are in their closed position, and inside surfaces, said positioning section being arranged so that in moving the panels from the closed position to the open position, the inside surfaces of the two panels are in the open position facing one another.

24. The door assembly as recited in claim 23, wherein said panels are hinge connected along adjacent side edges, and in the open position, the two panels are rotated toward one another during deployment to the open position so that inside surfaces of the two panels face one another.

25. The door assembly as recited in claim 23, wherein said positioning section comprises a main positioning arm which is pivotally mounted about a pivot location, and said first and second panels are operatively connected to said arm so as to be carried rotatably by said arm from the closed position toward the open position.

26. The door assembly as recited in claim 25, wherein said positioning section further comprising a positioning linkage mounted to said arm and interconnected to at least one of said panels so as to cause said one of said panels to rotate relative to the other of said panels.

27. The door assembly as recited in claim 19, wherein said landing gear assembly is in an airplane having a longitudinal center axis and the first door opening edge structure is on a first side of said longitudinal axis, and there is a second door opening edge structure on a second side of said longitudinal axis, and said panel section of claim 25 is a first panel section located on the first side of said longitudinal axis;
  a) said landing gear for assembly further comprising:
    i. a second panel section comprising at least first and second panels of said second panel section, each of which has first and second side edges, said panels of the second panel section having closed position where the panels are positioned side-by-side to extend across at least a portion of said door opening on the second side of said longitudinal axis, with the first edges of the first and second panels of the second panel section being closer to the second edge structure than the second edges of the first and second panels, respectively, of the second panel section;
    ii. a second positioning section operatively connected to said second panel section to move the first and second panels of the second panel section from the closed position toward the second edge structure to an open position where the panels of the second panel section are both on the same side of the travel path and the panels of the second panel section are clear of the travel path of the landing gear.

28. The door assembly as recited in claim 27, wherein said first and second panels of each panel section each have an outside surface which in stowed position is facing ambient atmosphere, and an inside surface, said positioning section of each panel section being arranged so that the first and second panels are moved to the open position where the inside surface of one of said panels and the outside surface of the other of said panels are facing toward one another.

29. THe door assembly as recited in claim 27, wherein each of said first and second panels of the first panel section is mounted for movement along a lateral path along which each panel rotates so that the second edges of the first and second panels rotate so that the second edges of the first and second panels rotate downwardly and toward the first edge structure, and each of the first and second panels of the second panel section is mounted for movement along a lateral path along which each panel rotates so that the second edges of the panels rotates downwardly and toward the second edge structure.

30. The door assembly as recited in claim 29, wherein each of said first and second panels is fixedly attached to first and second mounting arms, respectively, each of which has a first end pivotally mounted at an arm pivot location, and a second end connected to its related panel, and each panel moves from its closed position to its open position by traveling rotatably about the arm pivot location of its related mounting arm.

31. The door assembly as recited in claim 27, wherein said first and second panels of each panel section have outside surfaces which are exposed to outside atmosphere when the panels are in their closed position, and inside surfaces, said positioning section being arranged so that in moving the panels from the closed position to the open position, the inside surfaces of the two panels of each panel section are in the open position facing one another.

32. The door assembly as recited in claim 31, wherein said panels of each panel section are hinge connected along adjacent side edges, and in the open position, the two panels are rotated toward one another during deployment to the open position so that inside surfaces of the two panels face one another.

33. The door assembly as recited in claim 31, wherein each positioning section comprises a main positioning arm which is pivotally mounted about a pivot location, and each of said first and second panels is operatively connected to its related arm as as to be carried rotatably by said arm from the closed position toward the open position.

34. The door assembly as recited in claim 33, wherein each positioning section further comprises a positioning linkage mounted to said arm and interconnected to at least one of said panels so as to cause one of said panels to rotate relative to the other of said panels.

35. An airplane having a fuselage with a longitudinal center axis, and having first and second landing gear assemblies on opposite sides of the longitudinal axis, each of said landing gear assemblies comprising:
   a) a door opening structure having an outer door structure edge portion defining an outer edge of said door opening extending from the outer door edge structure toward the longitudinal axis;
   b) a retractable landing gear moveable through said door opening on a path of travel between a stowed position and an operating position;
   c) a panel section having a closed position and an open position, said panel section comprising at least an inner panel and an outer panel, which panels in the closed position extend substantially across said door opening in side-by-side relationship, with the inner panel being closer to the longitudinal axis and the outer panel being further from the longitudinal axis;
   d) a positioning section operatively connected to said panel section to move both of said panels from the closed position to an open position where both panels are on one side of the travel path of the landing gear, and with the panels being clear of the travel path of the landing gear.

36. The door assembly as recited in claim 35, wherien said panels at each landing gear assembly each have an outside surface which in the stowed position is facing ambient atmosphere, and an inside surface, said positioning section being arranged so that the panels are moved to the open position where the inside surface of one of said panels and the outside surface of the other of said panels are facing toward one another.

37. The door assembly as recited in claim 35, wherein each of said panels of each landing gear assembly is mounted for movement along a lateral path along which each panel rotates so that the inner edges of the panels closer to the longitudinal axis rotate downwardly and toward the second edge structure.

38. The door assembly as recited in claim 35, wherein each of said panels of each landing gear assembly is fixedly attached to first and second mounting arms, respectively, each of which has a first end pivotally mounted at an arm pivot location, and a second end connected to its related panel, and each panel moves from its closed position to its open position by traveling rotatably about the arm pivot location of its related mounting arm.

39. The door assembly as recited in claim 35, wherein said panels of each landing gear assembly have outside surfaces which are exposed to outside atmosphere when the panels are in their closed position, and inside surfaces, said positioning section being arranged so that in moving the panels from the closed position to the open position, the inside surfaces of the two panels are in the open position facing one another.

40. The door assembly as recited in claim 39, wherein said panels are hinge connected along adjacent side edges, and the two panels are rotated toward one another during deployment to the open position so that inside surfaces of the two panels face one another.

41. The door assembly as recited in claim 39, whereni said positioning section comprises a main positioning arm which is pivotally mounted about a pivot location, and said first and second panels are operatively connected to said arm so as to be carried rotatably by said arm from the closed position toward the open position.

42. The door assembly as recited in claim 41, wherein said positioning section further comprising a positioning linkage mounted to said arm and interconnected to at least one of said panels so as to cause said one of said panels to rotate relative to the other of said panels.

43. An airplane having a fuselage with a longitudinal center axis, and having first and second landing gear assemblies on opposite sides of the longitudinal axis, each of said landing gear assemblies comprising:
   a) a door opening structure having an inner door structure edge portion closer to the longitudinal axis, and an outer door structure edge portion further from said longitudinal axis, and defining a door opening;
   b) a retractable landing gear moveable through said door opening on a path of travel between a stowed position and an operating position;
   c) a panel section having a closed position and an open position, said panel section comprising at least an inner panel and an outer panel, which panels in the closed position extend substantially across said door opening in side by side relationship, with the inner panel being closer to the longitudinal axis and the outer panel being further from the longitudinal axis;
   d) a positioning section operatively connected to said panel section to move both of said panels from the closed position to an open position where both panels are on one side of the travel path of the landing gear, and with the panels being clear of the travel path of the landing gear.

* * * * *